United States Patent
Alrabady

(10) Patent No.: US 7,804,845 B2
(45) Date of Patent: Sep. 28, 2010

(54) METHOD TO CONFIRM THE SERVER IDENTITY FOR SERVER-INITIATED SERVICES

(75) Inventor: Ansaf I. Alrabady, Livonia, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1006 days.

(21) Appl. No.: 11/330,467

(22) Filed: Jan. 12, 2006

(65) Prior Publication Data

US 2007/0192436 A1 Aug. 16, 2007

(51) Int. Cl.
*H04J 3/00* (2006.01)
(52) U.S. Cl. ...................................................... 370/464
(58) Field of Classification Search ................. 370/211, 370/464; 455/414.1, 99, 418
See application file for complete search history.

(56) References Cited

U.S. PATENT DOCUMENTS 5,473,318 A * 12/1995 Martel ....................... 340/5.23

2005/0111031 A1 * 5/2005 Scott .......................... 358/1.15
2005/0195775 A1 * 9/2005 Petite et al. ................. 370/338
2007/0291783 A1 * 12/2007 Faber et al. ................. 370/461

OTHER PUBLICATIONS

McSherry, Tom, Obtaining Merchant Status for High Risk Businesses, 1993.*

* cited by examiner

Primary Examiner—Derrick W Ferris
Assistant Examiner—Christopher R Crompton
(74) Attorney, Agent, or Firm—John A. Miller; Miller IP Group, PLC

(57) ABSTRACT

A system and method for providing server identification to accept a server request in a vehicle wireless communications system. If the server wishes to send a request for a certain function to the vehicle, it will transmit the request and the vehicle will receive the request. If the vehicle receives a valid vehicle identification number, the vehicle will then ask the server to disconnect the communications link. The server will disconnect the communications link, and wait for the vehicle to call the server directly within a predetermined time window to confirm that it was in fact a valid server making the request. If the server confirms that it was the one making the initial request, the vehicle will perform the function.

16 Claims, 1 Drawing Sheet

US 7,804,845 B2

METHOD TO CONFIRM THE SERVER IDENTITY FOR SERVER-INITIATED SERVICES

BACKGROUND OF THE INVENTION

1. Field of the Invention

This invention relates generally to a system and method for providing a secure wireless communications link between a server and an entity and, more particularly, to a system and method for confirming the identity of a server used in a vehicle based wireless communications system before the vehicle will perform a function requested by the server.

2. Discussion of the Related Art

Communications systems are known in the art that allow a central service center to communicate wirelessly with a vehicle to provide various services, such as unlocking the vehicle door, updating the software in the various ECUs within the vehicle, etc. The central service center will include a server that wirelessly communicates with the vehicle using designated frequency channels through one or more of cellular based communications links, land-lines, satellite communications links and the internet.

Telematic services for these types of wireless vehicle communications systems can be classified into two categories, particularly vehicle initiated services and server initiated services. Vehicle initiated services, such as air bag notification, route direction, etc., require the vehicle to call the service center. Server initiated services, such as remote door unlock, wireless software download, etc., require the server to call the vehicle. For the vehicle to call the service center and the service center to call the vehicle, each side needs to have the others phone number. Typically, the service center phone number is programmed into the vehicle's ECU using a secure method, for example, physically installed during vehicle manufacturer.

Server initiated services are critical functions and require a high degree of confidence in the server identity before the vehicle can accept the service request. A hacker may wish to intentionally cause the vehicle system or manufacture harm for one reason or another, and may attempt to illicitly contact the vehicle to download a software virus to the vehicle, or other nefarious purposes. Therefore, it is desirable to provide a security system so that the identity of a server can be confirmed before the vehicle accepts a server request.

The current technique is to authenticate the server identity using cryptography, i.e., encoding the server request when it is transmitted, which is decoded by the vehicle. While cryptography provides good solutions for authentification, these solutions are not 100% reliable. It may be possible for a hacker to call the vehicle and masquerade as an authorized server if the hacker has the appropriate tools and time.

SUMMARY OF THE INVENTION

In accordance with the teachings of the present invention, a system and method for providing server identification to accept a server request in a vehicle wireless communications system is disclosed. If the server wishes to send a request for a certain function to the vehicle, it will transmit a message with the request and the vehicle will receive the message. If the vehicle receives a valid vehicle identification number, the vehicle will then ask the server to disconnect the communications link. The server will disconnect the communications link, and wait for the vehicle to call back the server directly within a predetermined time window to confirm that it was in fact a valid server making the request. If the server confirms that it was the one making the request, the vehicle will perform the function.

Additional features of the present invention will become apparent from the following description and appended claims taken in conjunction with the accompanying drawings.

DETAILED DESCRIPTION OF THE EMBODIMENTS

Figure 1:
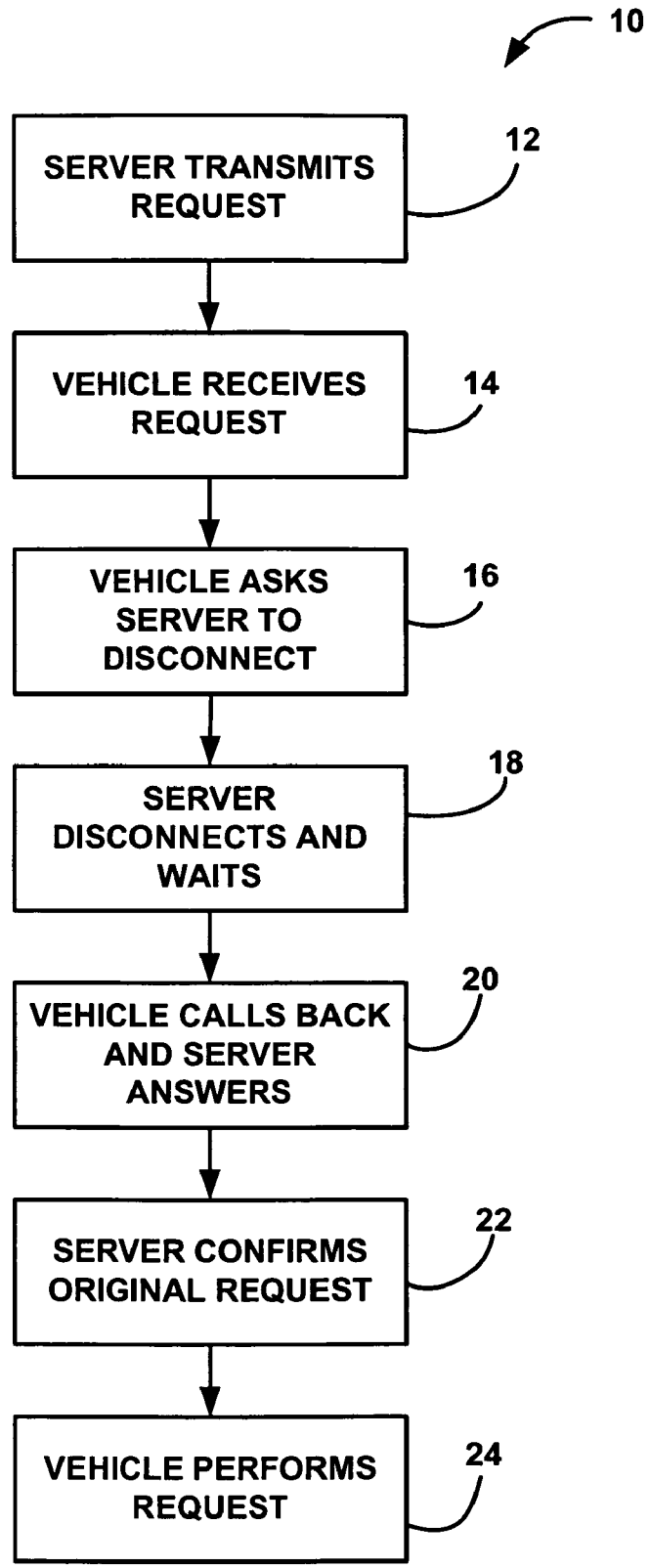
FIG. 1 is a flow chart diagram showing a method for verifying a server request in a vehicle wireless communications system, according to an embodiment of the present invention.

The following discussion of the embodiments of the invention directed to a system and method for verifying a server identity in a vehicle communications system is merely exemplary in nature, and is in no way intended to limit the invention or its applications or uses.

FIG. 1 is a flow chart diagram 10 showing the operation of a method, according to the invention, that provides authentification and confirmation of server identity for server initiated services in a vehicle wireless communications system. Various communications systems of this type are known in the art, such as On-Star™. The specific architecture, design and operation of the wireless communications system can be any one known in the art that is suitable for the invention discussed below, and is not necessary for a proper understanding of the invention.

At box 12, one of the servers at a central service center that is controlling the communications between the service center and the vehicles may initiate and transmit a service request to a particular vehicle for performing a certain function, such as unlocking the vehicle doors or updating software. The server will have stored a phone number and a vehicle identification number for every vehicle that it is part of the service. If the server wishes to make a request to a particular vehicle, it will call the vehicle in an attempt to perform that service request.

At box 14, the vehicle receives the request from the server to perform the particular function. When the server calls the vehicle, the vehicle and server authenticate each other by any suitable cryptographic manner to provide some verification, including confirming that the server has transmitted the vehicle identification number for that vehicle. At this point in time the vehicle does not know if the server is the authorized server, or possibly a hacker masquerading as the authorized server that may have somehow illicitly gotten the vehicle phone number and identification number.

According to the invention, the vehicle will then send a message back to the server asking it to disconnect the connection at box 16. The message from the vehicle to the server to disconnect is over the same communications link initiated by the server. By disconnecting the communications link, the vehicle can now start the process of verifying that the server is authentic.

The server disconnects and waits at box 18 after it has initiated the service request and the vehicle has asked it to disconnect. The vehicle then uses its preprogrammed server number to call the server back at box 20 and the server answers. The vehicle will know that the server number is valid because it was programmed into the vehicle at manufacture or downloaded by a valid entity. In one embodiment, the vehicle must call back within a certain predefined time window in order for the call-back to be valid. That time window will be application specific for a particular communications system, and be designed for many factors, including delay in transmission times, etc. In one non-limiting embodiment, the time window is a few seconds.

When the vehicle calls back and the server answers, the server will authenticate the message and confirm its original request at box 22 to perform the particular function. Because the vehicle has called the server with the known and stored number, and the server has been authenticated, the vehicle will have a high degree of confidence that the server request is valid. Therefore, the vehicle will accept and perform the service request at box 24. The server could re-send the service request or the vehicle could have stored the service request from the previous transmission from the server.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for verifying a server initiated function in a vehicle wireless communications system, said method comprising:
    transmitting a service request from the server to the vehicle over a first communications link;
    receiving the service request by the vehicle, said service request being a vehicle function;
    requesting that the server disconnect the first communications link; initiating a call from the vehicle to the server over a second communications link, wherein the server only waits a predetermined period of time to receive the call from the vehicle;
    confirming the service request from the server; and
    performing the service request on the vehicle by allowing the server to send or receive information.

2. The method according to claim 1 wherein the first and second communications links are encoded.

3. The method according to claim 1 wherein the predetermined period of time is a few seconds.

4. The method according to claim 1 further comprising storing the service request to later perform the service request once it is confirmed.

5. The method according to claim 1 further comprising re-transmitting the service request once it has been confirmed.

6. The method according to claim 1 wherein the service request is to upgrade software in the vehicle.

7. A verification system for verifying a server initiated function in a vehicle wireless communications system, said verification system comprising:
    means for transmitting a service request from the server to the vehicle over a first communications link;
    means for receiving the service request by the vehicle, said service request being a vehicle function;
    means for requesting that the server disconnect the first communications link;
    means for initiating a call from the vehicle to the server over a second communications link, wherein the server only waits a predetermined period of time to receive the call from the vehicle;
    means for confirming the service request from the server; and
    means for performing the service request on the vehicle by allowing the server to send or receive information.

8. The verification system according to claim 7 wherein the first and second communications links are encoded.

9. The verification system according to claim 7 wherein the predetermined period of time is a few seconds.

10. The verification system according to claim 7 further comprising means for storing the service request to later perform the service request once it is confirmed.

11. The verification system according to claim 7 further comprising means for re-transmitting the service request once it has been confirmed.

12. The verification system according to claim 7 wherein the service request is to upgrade software in the vehicle.

13. A vehicle wireless communications system, said system comprising:
    a vehicle; and
    a server, said server transmitting a service request to the vehicle over a first communications link, said service request being a vehicle function, said vehicle requesting that the server disconnect the first communications link, said vehicle initiating a call to the server over a second communications link, wherein the server only waits a predetermined period of time to receive the call from the vehicle, said server confirming the service request from the server, and said vehicle performing the service request by allowing the server to send or receive information.

14. The system according to claim 13 wherein the first and second communications links are encoded.

15. The system according to claim 13 wherein the vehicle stores the service request to later perform the service request once it is confirmed.

16. The system according to claim 13 wherein the server re-transmits the service request once it has been confirmed.

* * * * *